(12) United States Patent
Peterson (10) Patent No.: US 10,655,299 B2
(45) Date of Patent: May 19, 2020

(54) HANDHELD TRENCHING APPARATUS AND METHOD OF USING THE SAME

(71) Applicant: ECHO INCORPORATED, Lake Zurich, IL (US)

(72) Inventor: Brent Peterson, Buffalo Grove, IL (US)

(73) Assignee: Echo Incorporated, Lake Zurich, IL (US)

( * ) Notice: Subject to any disclaimer, the term of this patent is extended or adjusted under 35 U.S.C. 154(b) by 215 days.

(21) Appl. No.: 15/889,423

(22) Filed: Feb. 6, 2018

(65) Prior Publication Data

US 2019/0242090 A1    Aug. 8, 2019

(51) Int. Cl.
| | |
|---|---|
| *E02F 5/06* | (2006.01) |
| *E02F 3/02* | (2006.01) |
| *E02F 5/02* | (2006.01) |
| *A01G 3/08* | (2006.01) |

(52) U.S. Cl.
CPC .............. *E02F 5/06* (2013.01); *E02F 3/02* (2013.01); *E02F 5/02* (2013.01); *A01G 3/086* (2013.01)

(58) Field of Classification Search
CPC ...... E02F 5/06; E02F 3/02; E02F 5/02; A01G 3/062; A01G 3/086; A01G 3/0535; A01G 3/06; A01G 3/08; A01G 3/085
See application file for complete search history.

(56) References Cited

U.S. PATENT DOCUMENTS

| | | | | |
|---|---|---|---|---|
| 3,593,804 | A * | 7/1971 | Snider .................. | E02F 3/10 172/10 |
| 4,049,059 | A * | 9/1977 | Weibling ............. | A01B 33/027 172/15 |
| 4,429,477 | A * | 2/1984 | Tice .................... | E02F 3/142 172/100 |
| 4,651,449 | A * | 3/1987 | Rose ................... | E02F 3/142 37/465 |
| 6,179,059 | B1 * | 1/2001 | Notaras ............... | A01D 34/84 172/17 |
| 6,464,015 | B1 * | 10/2002 | Jones .................. | A01B 1/065 172/15 |
| 6,760,983 | B2 * | 7/2004 | Fergusson ........... | B23D 57/023 37/362 |
| 8,387,261 | B2 * | 3/2013 | Voyer .................. | A01G 23/067 144/2.1 |
| 9,107,352 | B2 * | 8/2015 | Stark ................... | A01G 3/062 |
| 10,165,728 | B2 * | 1/2019 | Zenkus ............... | A01D 34/84 |

(Continued)

*Primary Examiner* — Jamie L McGowan
(74) *Attorney, Agent, or Firm* — Wood, Phillips, Katz, Clark & Mortimer (57) ABSTRACT

A handheld trenching apparatus and method of forming a trench in ground using the apparatus. The apparatus has a frame, a cutting head, and a drive. The cutting head has a ground penetrating portion with a plurality of cutting members that are caused to be moved in a controlled path by the drive. The frame has an elongate frame part with the cutting head at one frame part end. The frame further has at least one graspable region spaced lengthwise of the elongate frame part from the first elongate frame part end. The ground penetrating portion is directed into the ground and while engaging the at least one graspable region the ground penetrating portion is moved in a trench forming direction as the drive is operated to thereby form a trench.

19 Claims, 8 Drawing Sheets

(56) References Cited

U.S. PATENT DOCUMENTS

| | | | | |
|---|---|---|---|---|
| 2002/0166677 | A1* | 11/2002 | Uhl | A01G 3/062 |
| | | | | 172/17 |
| 2012/0210585 | A1* | 8/2012 | Gieske | A01G 3/086 |
| | | | | 30/296.1 |
| 2013/0228350 | A1* | 9/2013 | Guenther | A01G 3/062 |
| | | | | 172/15 |
| 2016/0227694 | A1* | 8/2016 | Bermudez | A01D 34/90 |
| 2018/0084731 | A1* | 3/2018 | Harris | A01G 3/086 |
| 2018/0099398 | A1* | 4/2018 | Bergquist | B25F 5/02 |
| 2018/0317396 | A1* | 11/2018 | Bukowski | A01G 3/062 |

\* cited by examiner

HANDHELD TRENCHING APPARATUS AND METHOD OF USING THE SAME

BACKGROUND OF THE INVENTION

Field of the Invention

This invention relates to trenchers as used to form a continuous narrow opening in ground and, more particularly, to a handheld trenching apparatus that can be readily maneuvered, on and over, a ground surface by a user.

Background Art

Trencher technology for producing continuous, relatively shallow, narrow openings in different ground compositions/substrates continues to evolve. Such trenchers have in the past commonly been used to place wiring for low voltage components, such as landscape lighting and "invisible fencing". With new technology, flexible hose for watering systems has been put in place above anticipated frost line depths, making it possible to use the same trenching technology for this particular application.

For the above shallow trench applications, and others, trenching apparatus are commonly required to form trenches along paths where there is a relatively narrow width. For example, outdoor lighting may require placement of wire between landscape items, such as trees, rocks, flowers, and bushes.

Heretofore, trenching units have been made with different basic designs. Commonly, a toothed, digging chain is advanced in an endless path and is plunged/pressed into a substrate and thereafter moved to define a trenchlopening along a desired path.

One version of such a digging apparatus is tractor mounted whereby an operator can form the trench continuously as the tractor is advanced. This version is designed primarily for open spaces wherein the tractor is not required to maneuver between or around objects and obstacles.

Another version also has a wheeled support and can be manipulated by a rear handle arrangement through which the trencher can be pushed and pulled. An exemplary design is shown in U.S. Pat. No. 4,429,477 (Tice et al.). While this version is smaller in size than those using tractors, and thus more versatile in terms of being able to trench in more confined areas, it still has limitations with respect to where it can access. For example, in flower beds or in areas where there are bushes and other types of foliage, maneuvering of the trencher may be precluded over a substantial length of a trench to be formed. In those areas inaccessible with the trencher, the trench is normally hand formed as a result of which the buried component may be more shallowly placed, which is an undesirable alternative. Further, hand digging generally produces a relatively wide opening in which the substrate material must be compacted to maintain the buried component in place.

A third version is essentially a variation of the second version, noted above. It is a more compact, lightweight arrangement on one or more wheels that permits access to tighter spaces. An example of such a design is shown in FIG. 9 in U.S. Pat. No. 6,760,983 (Fergusson et al.). However, the wheels are generally spaced far enough apart for stability that access to many locations where a trench is to be formed is limited. Thus, the user may default to hand digging and/or placing the component to be buried in a shallower than desired trench.

In the latter two designs, the power source is typically located relatively close to the cutting chain. The width of the power source, by itself, may be substantial whereby maneuvering in tight spaces may be difficult. An exemplary design with this limitation is shown in U.S. Pat. No. 3,054,198 (George et al.).

In spite of the well-known limitations of the prior art, a unit does not exist that has adequate versatility in terms of being easily handled and moved into tight spaces to obviate the need to hand dig trench portions.

SUMMARY OF THE INVENTION

In one form, the invention is directed to a method of forming a trench in ground. The method includes the step of obtaining a handheld trenching apparatus having a frame, a cutting head on the frame, and a drive for operating the cutting head. The cutting head has a ground penetrating portion with a plurality of cutting members that are caused to be moved in a controlled path by the drive to thereby cause the cutting members to form a continuous trench in ground penetrated by the ground penetrating portion as the ground penetrating portion is advanced in a trench forming direction. The frame includes an elongate frame part having a length and first and second ends spaced in a lengthwise direction. The cutting head is at the first elongate frame part end. The frame further includes at least one graspable region spaced lengthwise of the elongate frame part from the first elongate frame part end and configured to be grasped by at least one user hand to allow maneuvering of the handheld trenching apparatus, including advancing the ground penetrating portion: i) into the ground; and ii) in the trench forming direction with the ground penetrating portion penetrating the ground. The method further includes the step of directing the ground penetrating portion into the ground, and while engaging the at least one graspable region, causing the ground penetrating portion to move in the trenching direction as the drive is operated to thereby form a trench.

In one form, the elongate frame part has a tubular shape between the first and second elongate frame part ends.

In one form, the cutting head has a housing with a surface that abuts to an exposed surface of the ground with the ground penetrating portion penetrating the ground to thereby control a depth of penetration of the ground by the ground engaging portion.

In one form, the cutting head housing surface has a curved shape that guides pivoting movement of the handheld trenching apparatus to thereby change an angular relationship between the handheld trenching apparatus and the ground and, as an incident thereof, depth of penetration of the ground by the ground engaging portion.

In one form, the cutting head is configured so that the controlled path for the cutting members has an obround shape.

In one form, the drive has a motor spaced from the cutting head.

In one form, the motor is located at the second end of the elongate frame part.

In one form, the at least one graspable region is a first graspable region on the elongate frame part.

In one form, the elongate frame part has an elongate tubular shape with a passageway. The drive further includes a transmission assembly that extends through the passageway and is configured to transmit a drive force from the motor to the cutting head to thereby operate the cutting head.

In one form, the elongate tubular shape has a length of at least 3 feet.

In one form, the at least one graspable region is a second graspable region on the elongate frame part and spaced from the first graspable region.

In one form, the motor is a combustion motor.

In one form, the motor is a battery operated motor.

In one form, the cutting head has a guide bar and an endless chain that moves against the guide bar. The plurality of cutting members is attached to the endless chain to follow movement of the endless chain.

In one form, the cutting head has a housing that defines a downwardly opening cavity within which the cutting members move. The cavity is configured to receive ground particles moved upwardly by the cutting members as a trench is being formed.

In one form, the method of forming a trench in ground further includes the steps of: starting with the handheld trenching apparatus held by a user at the at least one graspable region so that the handheld trenching apparatus is spaced above the ground to be trenched, advancing the ground penetrating portion into the ground while operating the cutting head; with the ground penetrating portion in the ground, continuing to operate the cutting head while advancing the ground penetrating portion in the trench forming direction; and after forming a desired trench configuration, fully separating the handheld trench forming apparatus from the ground.

In one form, the cutting head has a curved surface. The method of forming a trench in ground further includes the step of bearing the cutting head surface against the ground and thereby guiding movement of the handheld trenching apparatus along the ground as the trench is being formed.

In one form, the method of forming a trench in ground further includes the step of guidingly pivoting the handheld trenching apparatus on the curved cutting head surface to thereby change a depth of the trench being cut.

In one form, the method of forming a trench in ground includes the steps of carrying the handheld trenching apparatus to a site to form a trench and away from the site after the trench is formed with the entire handheld trenching apparatus elevated above the ground by a user.

In one form, the invention is directed to the handheld trenching apparatus described above.

DETAILED DESCRIPTION OF THE PREFERRED EMBODIMENT

Figure 1:
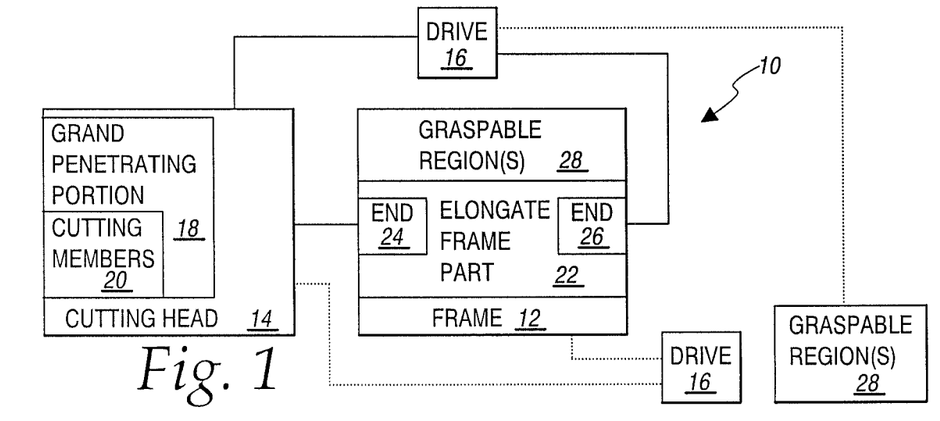
FIG. 1 is a schematic representation of a handheld trenching apparatus, according to the present invention.

The invention is directed to a handheld trenching apparatus, with a general form thereof shown schematically at 10 in FIG. 1, and a method of forming a trench in ground using the apparatus 10. The apparatus 10 consists of a frame 12 with a cutting head 14 on the frame 12. A drive 16 is provided for operating the cutting head 14.

The cutting head 14 has a ground penetrating portion 18 with a plurality of cutting members 20 thereon that are caused to be moved in a controlled path by the drive 16 to thereby cause the cutting members to form a continuous trench/opening in ground penetrated by the ground penetrating portion 18, as the ground penetrating portion 18 is advanced in a trench forming direction.

The frame 12 has an elongate frame part 22 with a length and first and second ends 24, 26, respectively, spaced in a lengthwise direction. The cutting head 14 is at the first end 24.

The frame 12 further has at least one graspable region 28, spaced lengthwise of the elongate frame part 22 from the first end 24, and configured to be grasped by at least one user hand to allow maneuvering of the handheld trenching apparatus 10, including advancing the ground penetrating portion 18: a) into the ground; and b) in the trench forming direction with the ground penetrating portion 18 penetrating the ground.

The handheld trenching apparatus 10, and parts thereof, are shown schematically in FIG. 1, and in other Figures, to encompass different forms of the components and their interaction. The specific forms described hereinbelow are exemplary in nature only.

In one variation of the structure in FIG. 1, the drive 16 may be provided on the frame 12 at other than the second end 26 as shown in solid lines in FIG. 1. In another variation, at least one of the graspable regions 28 may be provided on the drive 16 itself.

Figure 2:
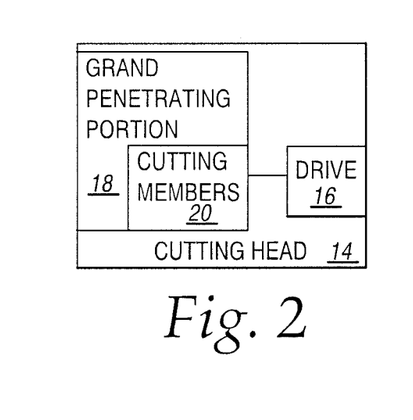
FIG. 2 is a schematic representation of a modified form of cutting head shown on the apparatus in FIG. 1.

In an alternative form, as shown in FIG. 2, the drive 16 is provided on the cutting head 14 to move the cutting members 20 on the ground penetrating portion 18.

Figure 3:
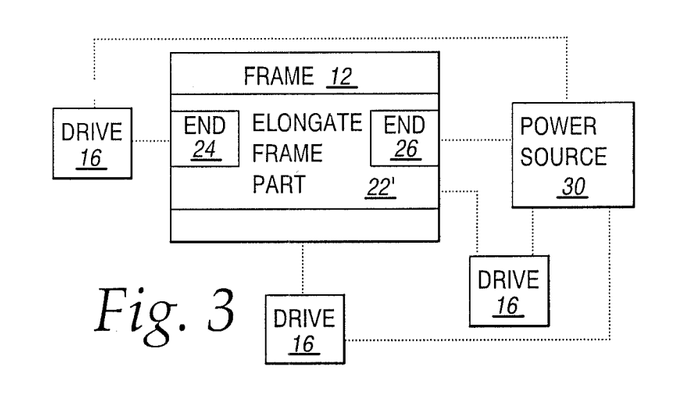
FIG. 3 is a schematic representation showing alternative arrangements for a drive and power source on a frame on the apparatus in FIG. 1.
Figure 4:
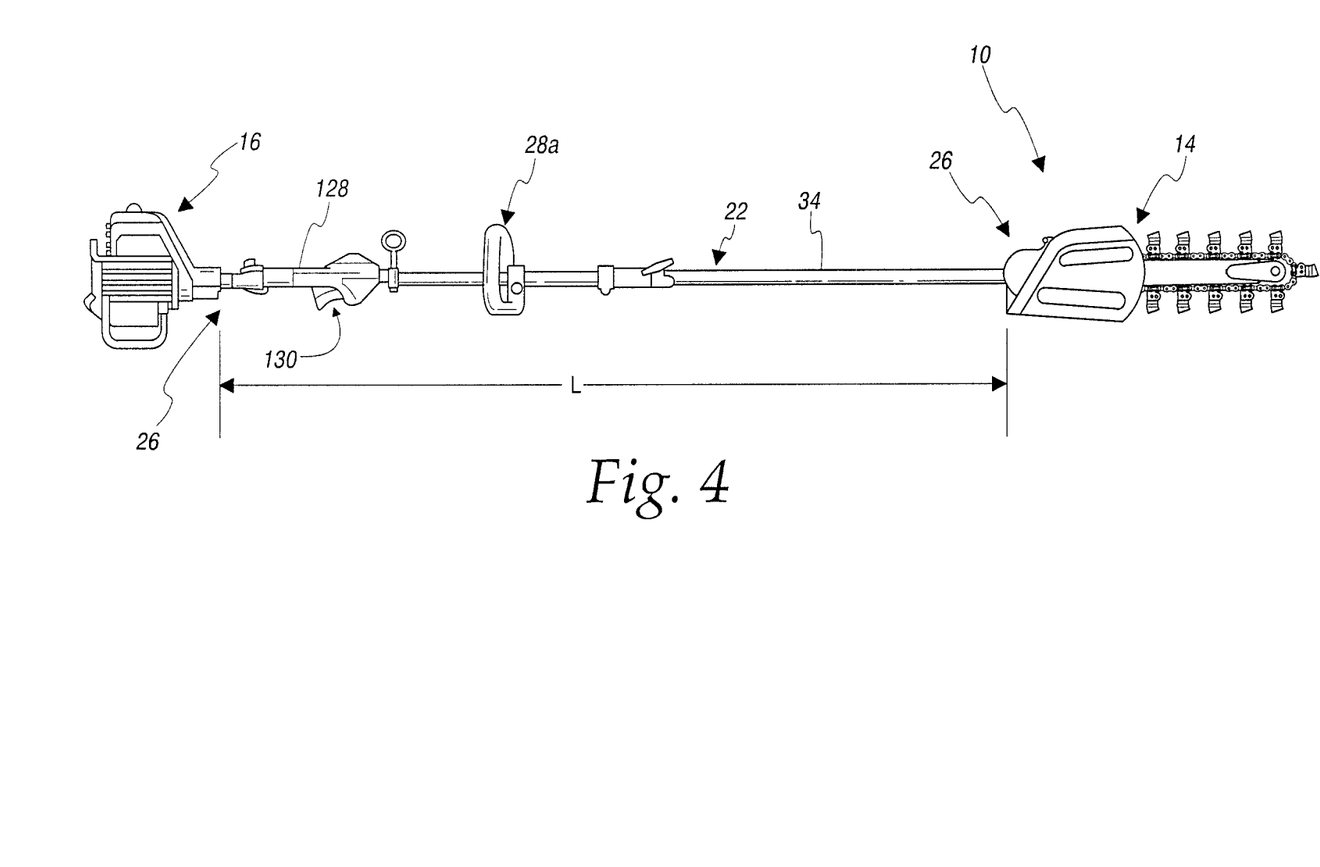
FIG. 4 is a side elevation of one exemplary form of apparatus as shown schematically in FIGS. 1-3.
Figure 5:
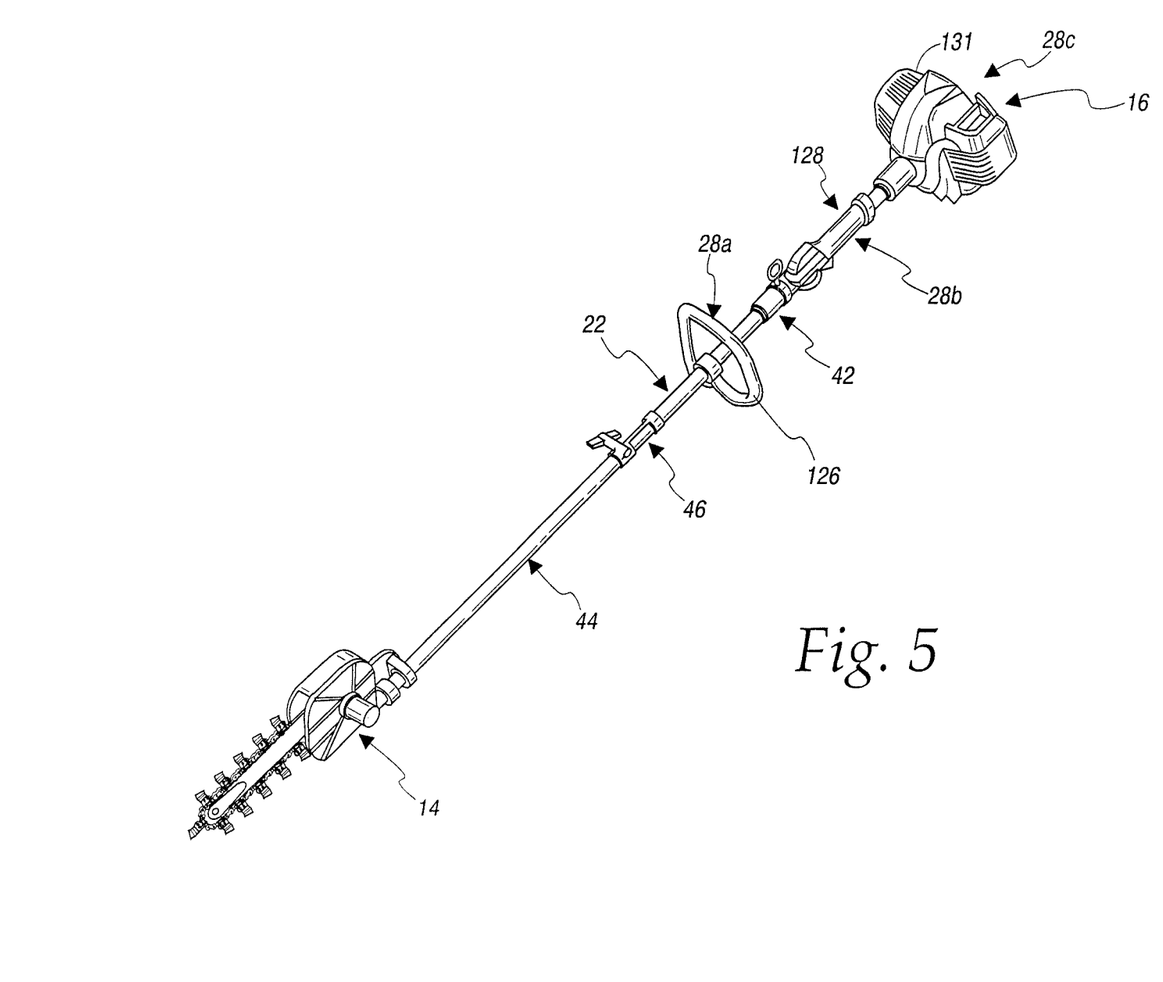
FIG. 5 is a perspective view of the apparatus in FIG. 4.

In a further alternative variation, as shown in FIG. 3, a separate power source 30 may be provided for the drive 16. As one example, the power source 30 may be a battery that operates a motor making up the drive 16. The motor on the drive 16 might be at either end 24, 26 of the elongate frame part 22 or intermediate the ends 24, 26 on the frame 12, with these optional configurations shown using dotted lines.

The drive 16 may be a combustion motor or a battery-operated motor. In the latter case, the motor and the battery may be together or separated to adopt an optimal weight distribution that facilitates handling. This is important since it is contemplated that the entire apparatus 10 is of a size and weight that it can be readily lifted and maneuvered by a user during operation and transportation thereof.

Before describing the inventive method in detail, an exemplary form of the handheld trenching apparatus, shown schematically in FIGS. 1-3, will be described, as shown in FIGS. 4-10.

On the handheld trenching apparatus 10, the depicted drive 16 is in the form of a combustion motor at the end 26 of the elongate frame part 22. The cutting head 14 is at the opposite end 26 of the elongate frame part 22.

Figures 6, 7:
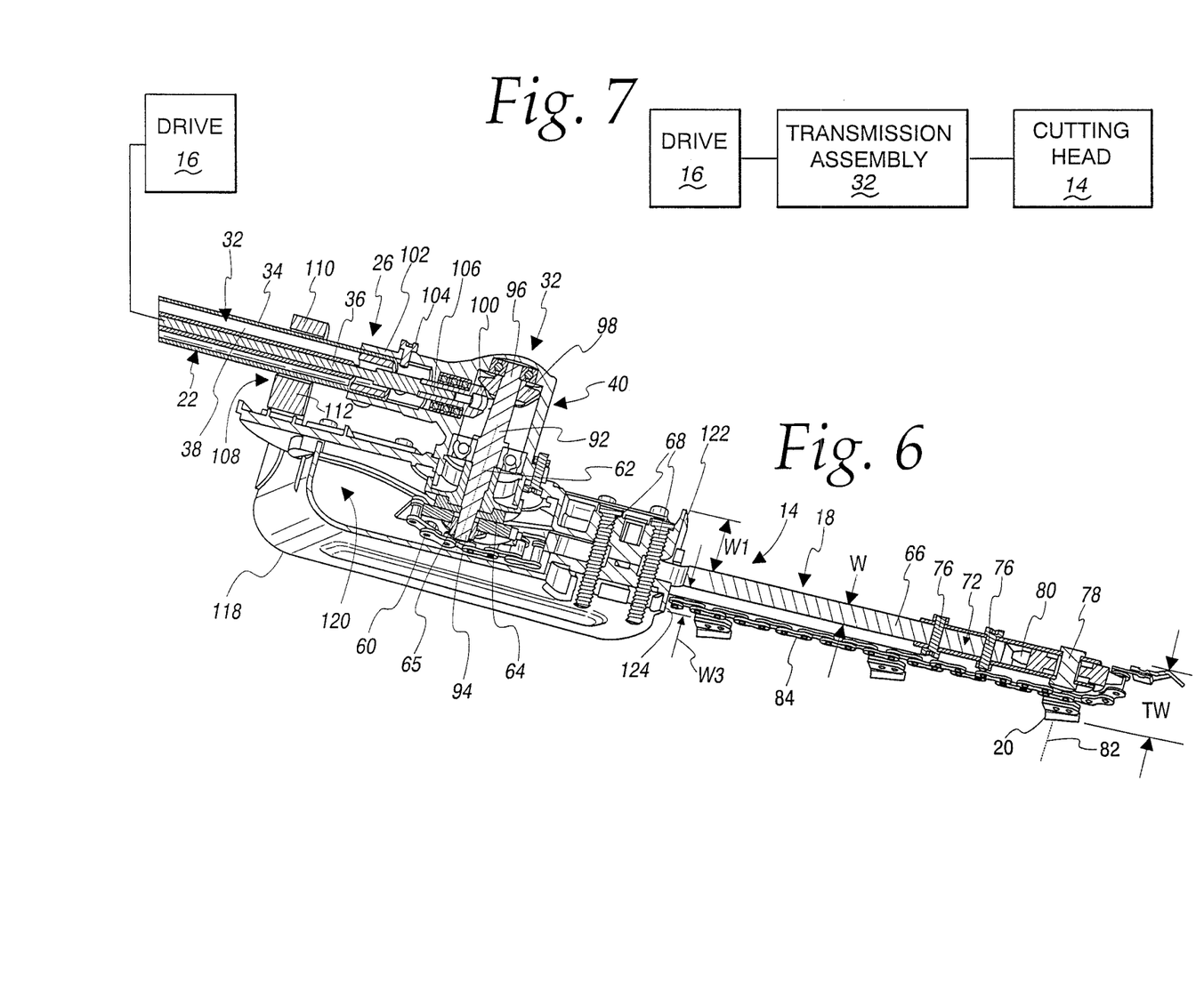
FIG. 6 is an enlarged, cross-sectional, perspective view of the cutting head on the apparatus in FIGS. 4 and 5.
FIG. 7 is a schematic representation of a transmission assembly between a drive and cutting head on the inventive apparatus.
Figure 8:
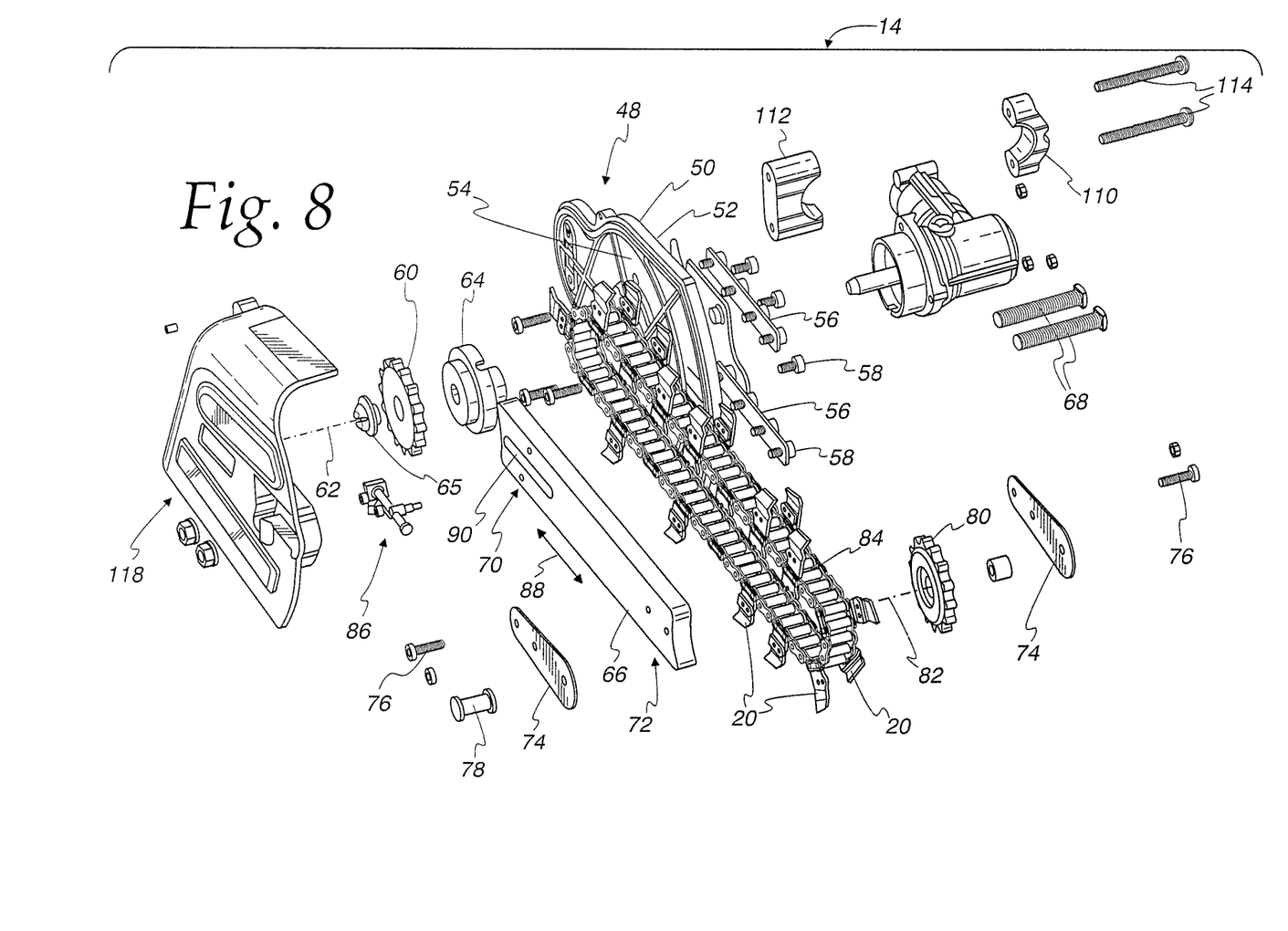
FIG. 8 is an enlarged, exploded, perspective view of the cutting head on the apparatus in FIGS. 4-6.
Figure 9:
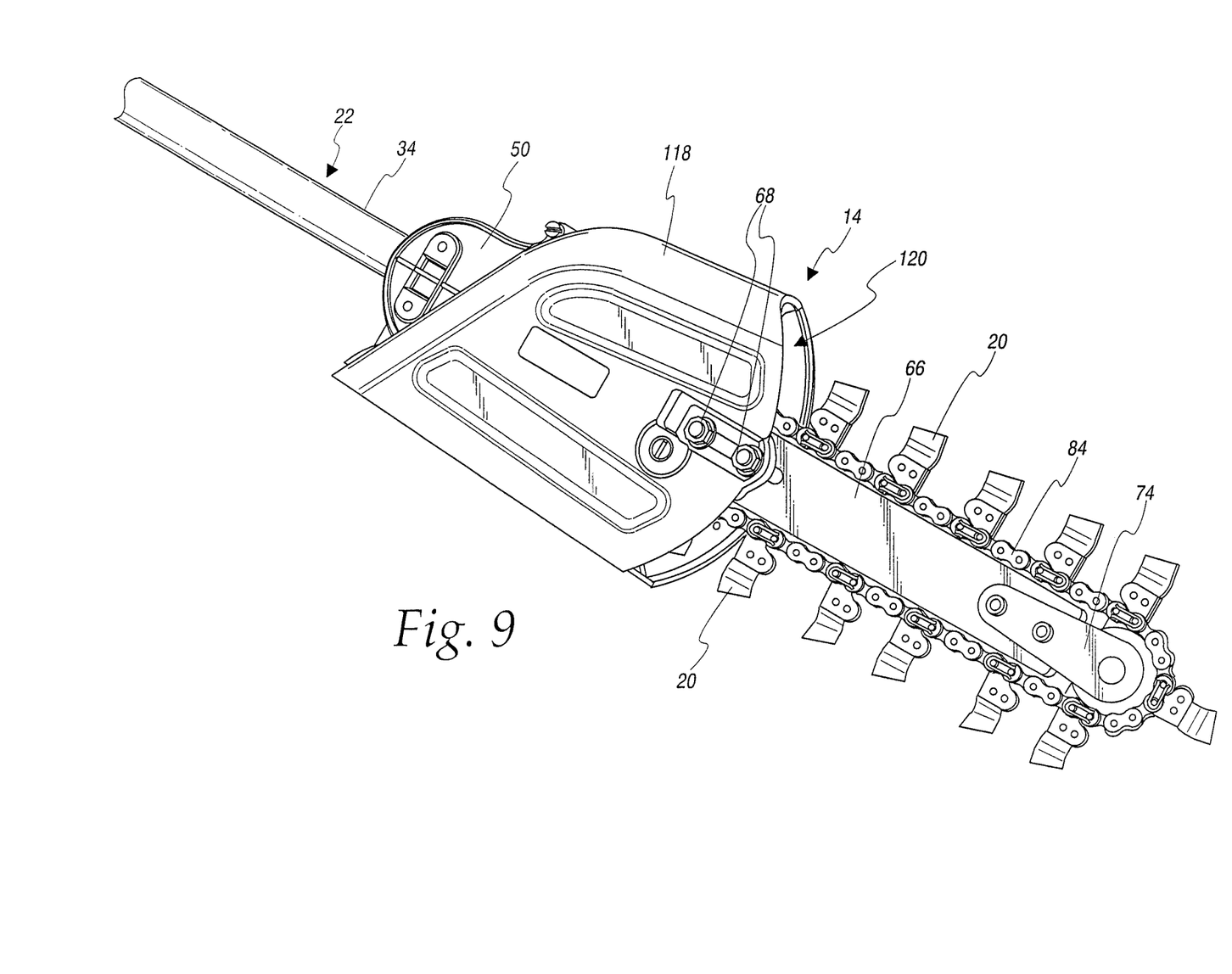
FIG. 9 is a view as in FIG. 8 with the components assembled.
Figure 10:
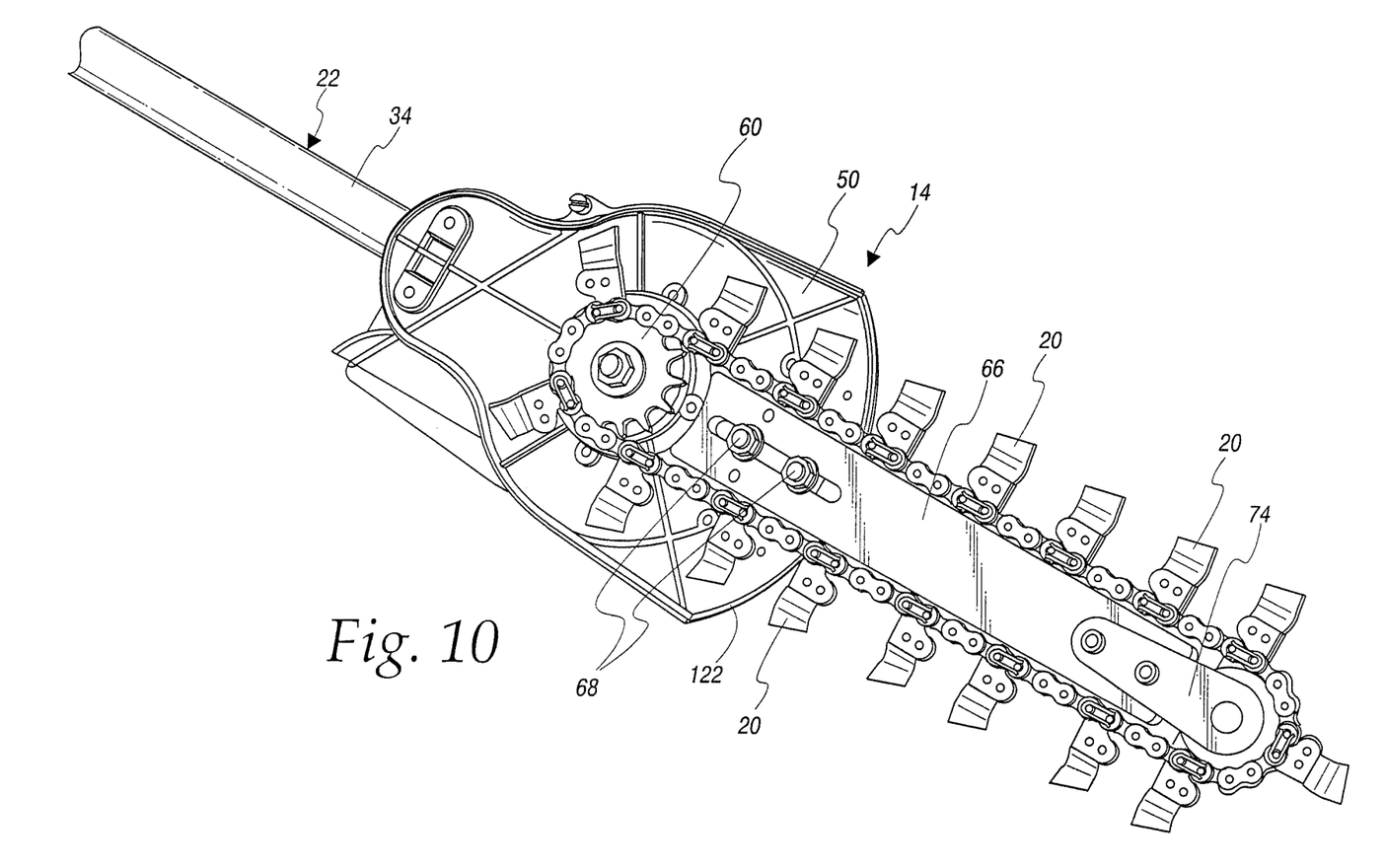
FIG. 10 is a view as in FIG. 9 with a housing/shield removed.

As shown schematically in FIG. 7, the drive 16 operates the cutting head 14 through a transmission assembly 32. The details of the transmission assembly 32 are not critical to the present invention and may take many different forms.

In this embodiment, the elongate frame part 22 consists of an elongate body 34 with a substantially constant tubular shape between the ends 24, 26, though this is not a requirement.

The transmission assembly 32 consists of a rotary shaft 36 extending through a passageway 38 defined by the tubular body 34 and transmits a drive force from the drive/motor 16 to the cutting head 14. This force is actually transmitted through a right angle gear box 40, the details of which will be described hereinbelow.

The depicted general form of the trenching apparatus 10, absent the cutting head 14, is one that the assignee sells commercially as its "Pro Attachment Series". In this design, the elongate frame part 22 is made up of upper and lower frame part sections 42, 44, respectively. In the commercial unit, the upper frame part section 42 and the drive/motor 16 make up a universal power component for a number of different accessories. In this embodiment, the accessory consists of the lower frame part section 44 and the cutting head 14.

Through a connecting arrangement at 46, the frame part sections 42, 44 can be selectively secured and released to allow interchange of attachments. Of course, it is contemplated that the entire frame part 22 can be a single continuous section without the ability to separate as depicted.

Additional details of an exemplary form of transmission assembly 32 are shown in the assignee's U.S. Pat. No. 8,020,304 (Mace et al.), the disclosure of which is incorporated herein by reference.

The cutting head 14 consists of a subframe 48 with a body 50 in the form of a generally flat plate with opposite sides 52, 54.

The body/flat plate 50 is reinforced on the side 52 by a pair of elongate straps 56 fixed to the body/flat plate 50 in a spaced, parallel relationship through a series of threaded fasteners 58.

On the opposite side 54, a drive sprocket 60 is mounted for turning around an axis 62. A spacer 64 resides between the sprocket 60 and the body/flat plate 50 and guides movement of the sprocket 60 in conjunction with a bushing 65 around which the sprocket 64 is journaled for rotation.

An elongate guide bar 66 is mounted on the body/flat plate 50 through fasteners 68 at one end 70 thereof. The opposite end 72 projects in cantilever fashion from the body/flat plate 50. A sprocket mount, made up of like plates 74, is fixed to the bar end 72 through fasteners 76. The bar end 72 is sandwiched between the plates 74 so that the plates 74 are spaced from each other a distance W equal to the width of the guide bar 66. The plates 74 cooperatively support a bridging bushing 78 around which a driven sprocket 80 is journaled for rotation around an axis 82, that is parallel to the axis 62.

An endless chain 84 is trained around the sprockets 60, 80 and the guide bar 66 to move in a continuous, controlled, obround path. The cutting members 20 are attached to the chain 84 to move therewith in the aforementioned cutting path.

The portion of the guide bar 66 that projects beyond the body/flat plate 50, and the endless chain 84 wrapped thereagainst at any point in operation, make up the aforementioned ground penetrating portion 18. The ground penetrating portion is elongate with a length.

A tensioning mechanism 86, of known construction, is provided to adjust tension on the cutting chain 84 by sliding the guide bar 66 controllably in a line, as indicated by the double-headed arrow 88, relative to the body/flat plate 50. This movement is permitted by providing an elongate slot 90 in the guide bar 66 through which the fasteners 68 extend.

A drive force from the drive/motor 16 is imparted to the sprocket 60 through the gear box 40. The gear box 40 consists of a first shaft 92 with one end 94 keyed to the sprocket 60. The opposite shaft end 96 has a bevel gear 98 fixed thereon that is in mesh with a bevel gear 100 at the end of the shaft 36.

In this embodiment, the gear box 40 has a sleeve 102 that surrounds the free end of the body 34 so as to make a telescoping connection therewith. A fastener 104 extends through the sleeve 102 and the body 34 to maintain a fixed connection between the gear box 40 and the elongate tubular body 34.

By releasing the fastener 104, the gear box 40 can be translated off of the end 106 of the shaft 36 to allow the cutting head 14 to be separated from the elongate tubular body 34. The connection of the initially separated cutting head 14 is accomplished by reversing the disassembly steps.

The body/flat plate 50 itself, and the connection between the body/flat plat 50 and elongate tubular body 34, are reinforced by a stabilizing block assembly 108, which consists of separate parts 110, 112, that are secured together by fasteners 114 so that the parts 110, 112 captively engage the elongate tubular body 34 and are braced against the side 52 of the body/flat plat 50. This stabilizes the body/flat plate 50 and maintains a predetermined spacing between the elongate tubular body 34 and the end of the body/flat plate 50 that cantilevers away from the gear box location.

A housing/shield 118 wraps around the aforementioned components mounted at the side 54 of the body/flat plate 50 and bounds in conjunction therewith a downwardly opening, cup-shaped cavity 120 within which the cutting members 20 move. The cavity 120 is configured to receive ground particles moved upwardly by the cutting members 20 as a trench is formed.

The housing/shield 118 deflects the upwardly moving ground particles back downwardly so that they are accumulated in piles on opposite sides of the guide bar 66 in proximity to the formed trench. When it is desired to close the trench, the dirt particles can be conveniently raked into the trench from opposite sides thereof.

The body/flat plate 50 has a curved/convex guide surface 122 with a width W1, at one side of the guide bar 66, that is substantially greater than the width W of the guide bar 66. The housing/shield 118 has a correspondingly shaped guide surface 124 with a width W3 on the side of the guide bar 66 opposite that at which the guide surface 122 is located. The width W3 is also greater than the width W. Preferably the guide surfaces 122, 124 have at least nominally the same shape that is interrupted by the guide bar 66, though this is not a requirement.

This convex guide surface arrangement obviates the need for wheels. However, the invention also contemplates constructions utilizing one or more guide wheels.

In a preferred form, the length L of the elongate tubular body 34 is at least three feet. Generally, this length will be greater than three feet but could also be less than three feet. While the tubular body 34 is shown with a constant cross-sectional configuration, the invention contemplates different configurations, and preferably those wherein the profile area taken in cross-section, orthogonal to the length L, is less than the corresponding profile of the cutting head 14, whereby the tubular body 34 can be maneuvered within relatively tight spaces.

In this embodiment, there are several different graspable regions 28. A conventional "D" ring 126 is provided on the elongate frame part 22 and defines one graspable region 28*a* whereat the "D" shape can be grasped at different locations to support the apparatus 10 comfortably in different orientations. The precise lengthwise location of the "D" ring 126 is dictated by the length L and the weight of the cutting head 14 and drive 16 and may be fixed or changeable.

An additional graspable region is provided at 28*b* in the form of a surrounding grip component 128 which defines an enlarged diameter with associated controls 130 thereon/ thereat that can be actuated with a user's hand's extending around the grip component 128.

Additionally, the drive 16 has a housing 131 that may provide an additional graspable region 28*c*.

Figure 11:
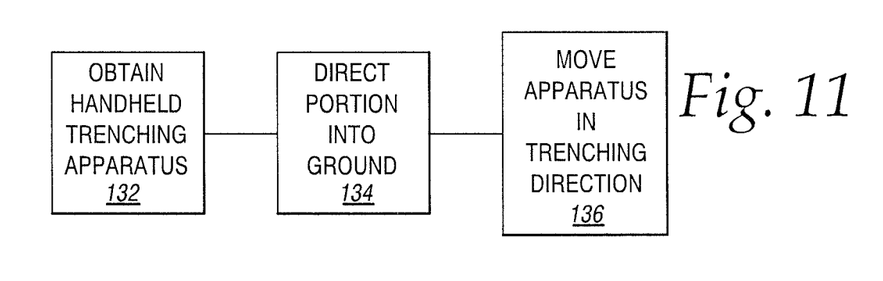
FIG. 11 is a flow diagram representation of a method of forming a trench in ground according to the invention.

With the above-described structure, a method of forming a trench in ground can be carried out as shown in flow diagram form in FIG. 11.

As shown at block 132, the aforementioned handheld trenching apparatus is obtained.

As shown at block 134, the ground penetrating portion on the handheld trenching apparatus is directed into the ground.

As shown at block 136, with the ground penetrating portion in the ground, through the at least one graspable region engaged by the user, the ground penetrating portion is moved in the trench forming direction as the drive is operated to form a trench.

It should be emphasized that while discrete graspable regions are specifically shown, other graspable regions on the apparatus are contemplated, even though they may not be specifically designed for grasping in a certain manner. For example, the elongate frame part might be grasped anywhere along the length thereof.

The invention contemplates that the handheld trenching apparatus 10 be readily transportable by a user, commonly by engaging the graspable regions 28. Given the weight of the components, the entire apparatus 10 can be readily lifted, maneuvered, and transported by a single individual, of average build and strength. During the trenching operation, the ground may serve as a support for the trenching apparatus, which effectively minimizes its weight and thereby facilitates maneuvering thereof. The weight of the apparatus 10 is supported by the ground penetrating portion 18 and eventually by the body/flat plate 50 and the housing/shield 118, once plunged to full depth.

Figure 12:
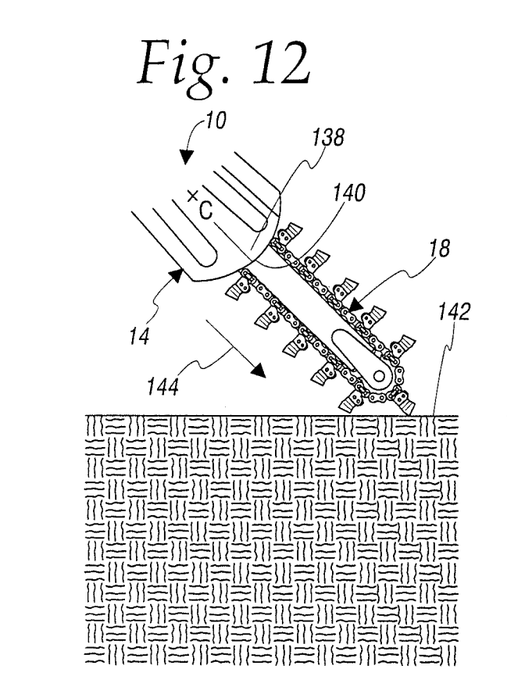
FIGS. 12-14 are schematic, sequence drawings showing a ground penetrating portion on the inventive cutting head being directed into a ground surface/substrate and thereafter being angularly reoriented to change a depth of penetration as the ground penetrating portion is advanced.
Figure 13:
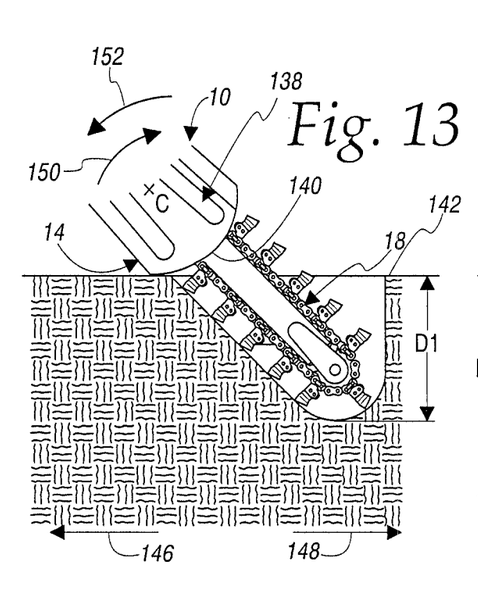
Figure 14:
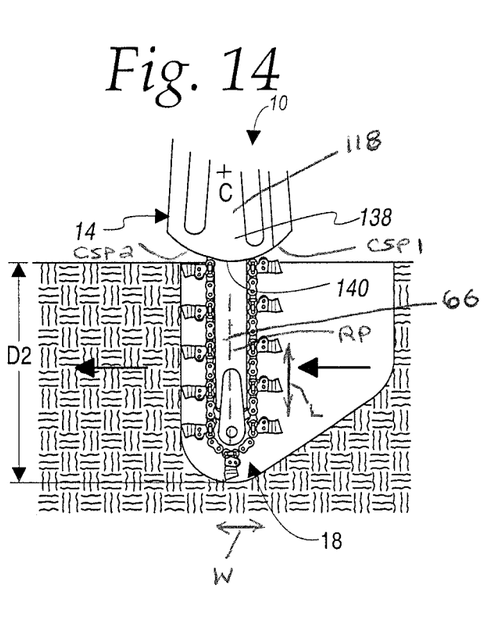

FIGS. 12-14 schematically show a sequence of steps performed to define a trench. For purposes of simplicity, the body/flat plate 50 and housing/shield 118 will be considered to cooperatively define a cutting head housing 138 with a convex surface 140 made up of one or both of the guide surfaces 122, 124.

The surface 140 guides translational movement of the apparatus 10 along the upper ground surface 142 upon which it bears and additionally serves as a fulcrum to allow pivoting of the apparatus 10. For purposes of simplifying explanation, the curvature of the surface 140 will be considered to have a center C, though it is not required that the surface 140 be arcuate with a constant radius.

As shown in FIG. 12, the user starts with the entire apparatus 10 elevated above the ground surface 142. As shown at FIG. 12, the ground penetrating portion is plunged into/through the ground surface 142, in a direction indicated by the arrow 144. The precise angle at which the ground penetrating portion 18 is plunged is not critical and may be dictated by the overall apparatus configuration and the most comfortable angle for a particular user.

In FIG. 13, the ground penetrating portion 18 is plunged to a depth D1, bringing the surface 140 into contact with the ground surface 142. By then sliding the surface 140 over the ground surface 142, the ground penetrating portion can be moved guidingly in either of two opposite trenching directions, as indicated by the arrows 146, 148.

By pivoting the cutting head 14 in one direction from the FIG. 13 position about the center C, as indicated by the arrow 150, the ground penetrating portion 18 extends to a greater depth D2, as shown in FIG. 14. Pivoting oppositely, as in the direction of the arrow 152, shallows the penetration depth.

With any selected depth, the apparatus 10 can be slid along the ground surface 142 on the guide surface 140 in a desired translational path. Slight deviation from a straight path can be effected without withdrawing the ground penetrating portion 18 in certain substrate compositions. Alternatively, the ground penetrating portion 18 can be withdrawn, reoriented, and re-inserted in the ground to change the direction of the trench line.

With reference to Fig, 14, it can be seen that the chain guide bar 66 is elongate with a length, as indicated by the double-headed arrow L, and a width, identified by the double-headed arrow W. The cutting members 20 move in the controlled path in a first plane, A reference plane RP, orthogonal to the first plane, bisects the width of the chain guide bar 66.

The cutting head housing/shield 118 has spaced curved surface portions CSP1 CSP2 on opposite sides of the reference plane RP. Accordingly, with the ground penetrating portion on the cutting head 14 plunged leading end first, as in FIG. 12, and positioned so that the length of the ground penetrating portion is aligned vertically, as in FIG. 14, wherein the cutting head housing engages with the ground, the cutting head 14 can be selectively pivoted in opposite directions, in each of which one of the curved surface portions CSP1, CSP2 acts against the ground to guide pivoting of the cutting head 14.

Of course, is not required that the surface 140 be borne against the ground surface 142 during trench formation. The user can effect trench formation by advancing the ground penetrating portion 18 without contact between the surface 140 and the ground surface 142. In other words, the user can do more of a freestyle formation of the trench.

At the completion of the trenching operation, the ground penetrating portion 18 can be fully withdrawn and the apparatus 10 transported to an appropriate location.

The width of the trench TW is determined by the combined width of the endless chain 84 and the cutting members 20 projecting oppositely therefrom. The trench width TW generally is less than two inches, but greater and lesser widths are contemplated.

The foregoing disclosure of specific embodiments is intended to be illustrative of the broad concepts comprehended by the invention.

The invention claimed is:

1. A method of forming a trench in ground, the method comprising the steps of:
    a) obtaining a handheld trenching apparatus comprising:
    a frame;
    a cutting head on the frame; and
    a drive for operating the cutting head,
    the cutting head comprising a ground penetrating portion with a leading end and a plurality of cutting members that are movable relative to each other and caused to be moved in a controlled path by the drive to thereby cause the cutting members to form a continuous trench in ground penetrated by the ground penetrating portion as the ground penetrating portion is advanced in a trench forming direction, the frame comprising an elongate frame part having a length and first and second ends spaced in a lengthwise direction, the cutting head at the first elongate frame part end, the frame further comprising at least one graspable region spaced lengthwise of the elongate frame part from the first elongate frame part end and configured to be grasped by at least one user hand to allow maneuvering of the handheld trenching apparatus including advancing the ground penetrating portion: i) into the ground; and ii) in the trench forming direction with the ground penetrating portion penetrating the ground; and b) directing the ground penetrating portion into the ground and while engaging the at least one graspable region causing the ground penetrating portion to move in the trenching direction as the drive is operated to thereby form a trench, wherein the cutting head has a housing with a surface that abuts to an exposed surface of the ground with the ground penetrating portion penetrating the ground to thereby control a depth of penetration of the ground by the ground penetrating portion, wherein the cutting head housing surface has a curved shape that guides pivoting movement of the handheld trenching apparatus to thereby change an angular relationship between the handheld trenching apparatus and the ground and as an incident thereof depth of penetration of the ground by the ground engaging portion, wherein the curved shape is located so that the curved shape abuts to the exposed surface of the ground as an incident of the ground penetrating portion being plunged leading end first into the ground.

2. The method of forming a trench in ground according to claim 1 wherein the elongate frame part has a tubular shape between the first and second elongate frame part ends.

3. The method of forming a trench in ground according to claim 1 wherein the cutting head is configured so that the controlled path for the cutting members has an obround shape.

4. The method of forming a trench in ground according to claim 1 wherein the drive comprises a motor spaced from the cutting head.

5. The method of forming a trench in ground according to claim 1 wherein the motor is located at the second end of the elongate frame part.

6. The method of forming a trench in ground according to claim 5 wherein the at least one graspable region comprises a first graspable region on the elongate frame part.

7. The method of forming a trench in ground according to claim 6 wherein the elongate frame part has an elongate tubular shape with a passageway and the drive further comprises a transmission assembly extending through the passageway and configured to transmit a drive force from the motor to the cutting head to thereby operate the cutting head.

8. The method of forming a trench in ground according to claim 7 wherein the elongate tubular shape has a length of at least 3 feet.

9. The method of forming a trench in ground according to claim 7 wherein the at least one graspable region comprises a second graspable region on the elongate frame part and spaced from the first graspable region.

10. The method of forming a trench in ground according to claim 4 wherein the motor is a combustion motor.

11. The method of forming a trench in ground according to claim 4 wherein the motor is a battery operated motor.

12. The method of forming a trench in ground according to claim 1 wherein the cutting head comprises a guide bar and an endless chain that moves against the guide bar, the plurality of cutting members attached to the endless chain to follow movement of the endless chain.

13. The method of forming a trench in ground according to claim 1 wherein the cutting head comprises a housing that defines a downwardly opening, cup-shaped cavity within which the cutting members move and which is configured to receive ground particles moved upwardly by the cutting members as a trench is being formed.

14. The method of forming a trench in ground according to claim 1 further comprising the steps of: starting with the handheld trenching apparatus held by a user at the at least one graspable region so that the handheld trenching apparatus is spaced above the ground to be trenched, advancing the ground penetrating portion into the ground while operating the cutting head; with the ground penetrating portion in the ground, continuing to operate the cutting head while advancing the ground penetrating portion in the trench forming direction; and after forming a desired trench configuration, fully separating the handheld trench forming apparatus from the ground.

15. The method of forming a trench according to claim 1 further including the step of bearing the curved cutting head surface against the ground and thereby guiding movement of the handheld trenching apparatus along the ground as the trench is being formed.

16. The method of forming a trench according to claim 15 further including the step of guidingly pivoting the handheld trenching apparatus on the curved cutting head surface to thereby change a depth of the trench being cut.

17. The method of forming a trench in ground according to claim 1 including the steps of carrying the handheld trenching apparatus to a site to form a trench and away from the site after the trench is formed with the entire handheld trenching apparatus elevated above the ground by a user.

18. The handheld trenching apparatus recited in claim 1.

19. A method of forming a trench in ground, the method comprising the steps of:

a) obtaining a handheld trenching apparatus comprising:

a frame;

a cutting head on the frame; and a drive for operating the cutting head, the cutting head comprising a ground penetrating portion with a leading end and a plurality of cutting members that are movable relative to each other and caused to be moved in a controlled path by the drive to thereby cause the cutting members to form a continuous trench in ground penetrated by the ground penetrating portion as the ground penetrating portion is advanced in a trench forming direction, the frame comprising an elongate frame part having a length and first and second ends spaced in a lengthwise direction, the cutting head at the first elongate frame part end, the frame further comprising at least one graspable region spaced lengthwise of the elongate frame part from the first elongate frame part end and configured to be grasped by at least one user hand to allow maneuvering of the handheld trenching apparatus including advancing the ground penetrating portion: i) into the ground;

and ii) in the trench forming direction with the ground penetrating portion penetrating the ground; and b) directing the ground penetrating portion into the ground and while engaging the at least one graspable region causing the ground penetrating portion to move in the trenching direction as the drive is operated to thereby form a trench, wherein the plurality of cutting members move in the controlled path around a guide bar, wherein the guide bar is elongate with a length and a width, wherein the controlled path resides in a first plane, wherein a reference plane, orthogonal to the first plane, bisects the width of the guide bar, wherein the cutting head has a housing with curved surface portions on opposite sides of the reference plane, whereby with the cutting head plunged leading end first to engage the cutting head housing with the ground, and the cutting head positioned so that the length of the guide bar is oriented vertically, the cutting head can be selectively pivoted in opposite directions and in each of the opposite directions one of the curved surface portions acts against the ground to guide pivoting of the cutting head.

* * * * *